United States Patent Office 3,493,428
Patented Feb. 3, 1970

3,493,428
TRANSPARENT NICKEL COATED GLASS OR QUARTZ PLATE AND METHOD OF MANUFACTURE
Oscar Emanuel Hedberg, Leif Erik Roland Söderberg, and Johan Eric Hayden Westberg, Lidingo, Sweden, assignors to AGA Aktiebolag, Lidingo, Sweden, a corporation of Sweden
No Drawing. Filed June 1, 1966, Ser. No. 554,323
Int. Cl. C03c 17/06; H05k 3/00; B44d 1/18
U.S. Cl. 117—211                                5 Claims

ABSTRACT OF THE DISCLOSURE

A nickel-coated plate of glass or quartz for electrical heating is treated in argon between 300 and 500° C. to bring the resistance down to a low constant value.

The invention relates to nickel coating a plate, particularly a window-pane, of glass or quartz.

The object of the invention is to produce a plate having the following properties:

Low transparency to heat radiation, and high transparency to light,

Low distortion of the colour of visible light passing through it, and

Low electrical resistance.

The low resistance is of importance because it enables heating by current without the need for too high a voltage, which facilitates defrosting or deicing by means of an electric current.

There have been suggested various coatings for glass in the form of metals or oxides thereof in order to realize the above mentioned objects. Gold has a substantial effect in suppressing heat radiation even when a very thin layer is used and its resistance is low, however, it is costly and mechanically sensitive, so that a coating of gold is easily destroyed. Also, it causes heavy distortion of the colour of visible light. Nickel has also been suggested and has the advantage of being much less expensive than gold. However, its resistance is high and the suppression of visible light is more pronounced than that of heat radiation, particularly when a coating method is used resulting in the nickel coating having an appreciable content of phosphides.

The method of the invention leads to substantial improvement in these respects and comprises coating the plate with a thin layer of Ni, and heating the coated plate in argon gas.

The temperature of the heat treatment should be between 300 and 500° C.; optimum results have been obtained between 350 and 400° C.

Experiments performed with heating of the plate to about 400° C. in argon appear to indicate that the nickel coating by this treatment is given a more even and homogeneous structure, which may be an explanation for the improved qualities of glass treated in this manner.

The invention is of particular advantage when the deposition of nickel contains appreciatble quantities of nickel phosphides. These have a very high initial resistance for a certain value of transmittance, which results in an unfavourable relationship between the transmittance to heat and to light. On the other hand, these depositions have the advantage of being relatively stable with regard to long-term changes in resistance, presumably due to oxidation. The argon treatment results in a drastic reduction of resistance as well as an improvement of the transmittance relationship referred to.

EXAMPLE I

A glass plate is subjected to the following steps:

Thorough cleaning with a detergent or an abrasive
Rinsing with $H_2O$
Treatment for one minute with a 0.2% solution of $SnF_2$ having a pH of 3
Rinsing with $H_2O$
Treatment with a solution containing 0.03% $PdCl_2$, pH=4, for one-half minute
Rinsing with $H_2O$.

Treatment for 10 minutes in a nickel bath of the following composition:

|  | G. |
|---|---|
| $NiSO_4$ | 25 |
| $CH_3COONa$ | 10 |
| Sodium hypophosphite | 25 |
| Hydrazine sulphate | 10 |
| $H_2O$ | 1000 | pH=4.5, temperature between 30 and 40° C.
Rinsing with $H_2O$ having a wetting agent added thereto.

After the completion of the nickel deposition, the plate is heated in an argon atmosphere. A plate or batch comprising about 6 to 8 plates according to thickness is lowered into a steel box, the upper end of which has the form of a U-shaped channel. The channel is filled with fine-grained sand and the lid of the box has a downward edge which is immersed in the sand when the lid is closed. The box is placed in a vacuum vessel connected to a vacuum pump. An argon storage container is connected with the steel box by way of a conduit passing through the vacuum vessel. The storage container is held closed while the vessel is being evacuated down to below 1 mm. $H_2O$. The pressure in the box will obtain the same value, as the air contained in it will pass out through the sand lock. Argon is then supplied from the storage container until the pressure in the vessel is a few mms. $H_2O$ above atmospheric, whereupon the vessel is opened. The supply of argon to the box is continued so as to maintain an overpressure of about 30 mms. in the same. In the experiments made, the sand lock was efficient enough to make a supply of 8 l./min. of argon be sufficient. The box is then taken out of the vessel and brought into an oven, where it is heated to 380° C. in the course of 1 hour. The temperature is maintained at this value for 1 hour and is then allowed to go down to 50° C. in 4 hours, whereupon the supply of gas is interrupted, the box is opened and the plate is removed therefrom. This completes the process.

EXAMPLE II

The treatment with a solution of $SnF_2$ may be replaced with a treatment with $SnCl_2$ as described in U.S. Patent No. 2,702,253.

The above Examples I and II apply to quartz just as well as to glass.

In a practical test it was found that the heat-treatment in argon reduced the surface resistance measured between a pair of electrodes extending along opposite sides of a square-shaped portion of the coated glass plate from 50000 to 200 and the heat transmittance from 35 to 25%, the light transmittance having a value of 30% before as well as after the heat treatment.

Argon has been found to be superior to other inert gases for the reason that the heat treatment may be carried out at a higher temperature which gives a more complete reduction in resistance and heat transmittance.

What is claimed is:

1. A method of manufacturing a transparent plate of a material selected from the group consisting of glass and quartz and having low transparency to heat radiation and low surface resistance, comprising the steps of: electrolessly coacting a plate of said material with a thin layer of Ni, introducing the coated plate into argon gas, and subjecting the plate to a heat treatment at a temperature of from 300 to 500° C. in said argon gas.

2. A method as claimed in claim 1, in which said heat treatment carries the temperature of the plate to between 350 and 400° C.

3. A method as claimed in claim 1, in which the duration of said heat treatment is about 1 hour.

4. A method as claimed in claim 3, in which said heat treatment comprises an initial phase of about one hour's duration and during which the temperature is raised to a constant value to be maintained for about one hour and followed by a period of cooling down to normal temperature in about 4 hours.

5. A transparent plate of a material selected from the group consisting of glass and quartz having low transparency to heat radiation, characterized by a coating of Ni obtained by heat treating a layer of Ni deposited on said plate in argon gas.

References Cited
UNITED STATES PATENTS

| | | | |
|---|---|---|---|
| 2,968,578 | 1/1961 | Mochel | 117—124 XR |
| 3,202,538 | 8/1965 | Beynon | 117—124 XR |
| 3,212,918 | 10/1965 | Tsu et al. | 117—54 |
| 3,379,556 | 4/1968 | Shiecchi | 117—124 XR |

ALFRED L. LEAVITT, Primary Examiner

W. F. CYRON, Assistant Examiner

U.S. Cl. X.R.

117—160, 227, 229